United States Patent [19]

Fujio

[11] Patent Number: 5,043,130
[45] Date of Patent: Aug. 27, 1991

[54] METHOD OF MANUFACTURING LABELED CONTAINERS

[75] Inventor: Masaaki Fujio, Osaka, Japan

[73] Assignee: Fuji Seal Industry Co., Ltd., Osaka, Japan

[21] Appl. No.: 550,164

[22] Filed: Jul. 9, 1990

[51] Int. Cl.$^5$ ............... B29C 51/10; B29C 51/12; B29C 51/16

[52] U.S. Cl. .................. 264/509; 264/516; 425/503; 425/504; 156/245; 156/285; 156/287

[58] Field of Search ............ 264/509, 515, 516, 550; 425/503, 504, 112; 156/245, 285, 382, 497, 287

[56] References Cited

U.S. PATENT DOCUMENTS

| 2,805,787 | 9/1957 | Sherman | 264/516 |
| 3,770,860 | 11/1973 | Amberg et al. | 264/509 |
| 3,964,856 | 6/1976 | Day | 425/503 |
| 4,146,418 | 3/1979 | Walter | 156/245 |
| 4,323,411 | 4/1982 | Uhlig | 156/245 |
| 4,605,462 | 8/1986 | Lehner | 264/509 |

FOREIGN PATENT DOCUMENTS

| 1191262 | 4/1965 | Fed. Rep. of Germany | 156/245 |
| 58-187319 | 11/1983 | Japan | 264/516 |
| 61-127327 | 6/1986 | Japan | 264/511 |

Primary Examiner—Jan H. Silbaugh
Assistant Examiner—Catherine Timm
Attorney, Agent, or Firm—Koda and Androlia

[57] ABSTRACT

A method of manufacturing a labeled container of synthetic resin having a label affixed to its outer periphery. A heat-stretchable tubular label is inserted into a forming die, and a thermoplastic resin sheet which has been heated and softened is positioned within a space defined by the label. When the resin sheet is expanded radially of the tubular label, the resin sheet is expanded radially under heat simultaneously with the resin sheet, so that both the resin and the label are formed into a shape conforming to the internal surface configuration of the forming die.

2 Claims, 5 Drawing Sheets

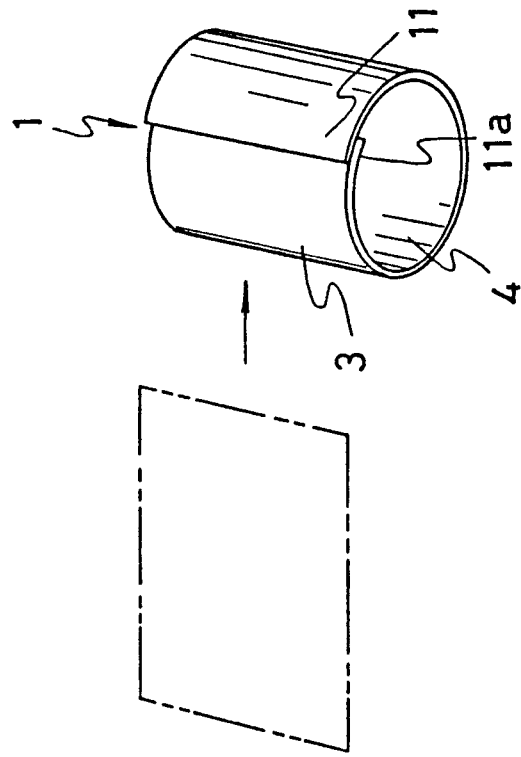
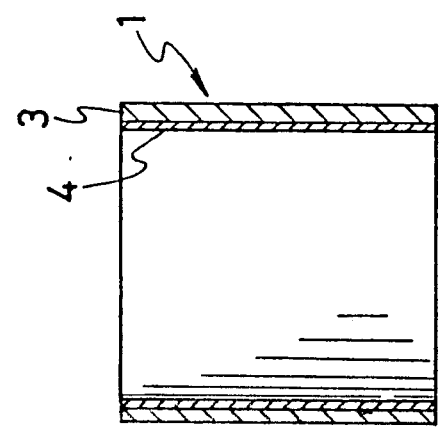

METHOD OF MANUFACTURING LABELED CONTAINERS

BACKGROUND OF THE INVENTION

1. Field of the Invention

This invention relates to a method of manufacturing a labeled synthetic-resin container having a label fitted on its outer periphery.

2. Description of the Background Art

Hitherto, it has been known to manufacture a container 12 fitted with a label 1a as shown in FIG. 5, in manner as illustrated in FIG. 6.

This known method is such that after a paper-made tubular label 1a placed in a container forming die 2 so as for it to extend closely along the inner periphery thereof as in FIG. 6 (a), a synthetic resin sheet 5 is forced by means of a plug 6a into a space defined by the label 1a as in FIG. 6 (b), whereby pressure forming is effected to form the resin sheet 5 and the label 1a into integral unity. Such method provides an advantage that the label 1a can be formed as such simultaneously with a container in integral relation therewith, label fitting operation being thus simplified.

With the foregoing prior art method, however, it is necessary that in order to allow a paper-made tubular label 1a to be properly fitted on the outer periphery of a formed container, the label 1a, before it is placed in the forming die 2, must be accurately sized and preformed to a desired shape (truncated conical shape in FIG. 7) conforming to the inner surface configuration of the forming die 2 as shown in FIG. 7. Such label preforming operation is very troublesome, which is a cause of poor production efficiency.

Another difficulty with the prior art is that if preforming of the label 1a is inaccurately done so that the label 1a is inconsistent with the inner surface configuration of the forming die 2, the resin sheet 5 is prevented by the label 1a from being formed into a proper container shape, with the result of a forming loss being caused, which poses a fatal problem with the prior art method.

SUMMARY OF THE INVENTION

It is a primary object of the invention to eliminate the necessity of preforming a label exactly to a shape conforming to the inner surface configuration of a forming die to thereby enhance operating efficiency, and to suitably prevent possible container-forming defects due to label preforming errors, thus enabling labeled-container manufacturing operation to be successfully carried out.

The invention is directedd to solving aforesaid problems with the prior art by varying the shape and size of the label to a condition conforming to the inner surface configuration of the forming die in corresponding relation to changes in the resin sheet being shaped within the forming die, without requiring preforming a label of paper or the like material which is inflexible to changes in shape before the label is inserted into the forming die.

In accordance with the invention there is provided a method of manufacturing a labeled container wherein a heat-stretchably formed tubular label 1 is placed within a forming die 2 and a thermally softened thermoplastic resin sheet 5 is positioned within a space defined by the label 1 so that the resin sheet 5 can be radially expanded, characterized in that the label 1 is radially expanded under heat in conjunction with the resin sheet 5 being radially expanded, the label 1 being thereby formed to a shape conforming to the interior surface of the forming die. According to the aforesaid method of manufacturing, when the resin sheet 5 is formed into a container shape, the label 1 is radially expanded simultaneously with the resin sheet 5 so that it is formed to a shape conforming to the inner periphery of the forming die 2, and this eliminates the necessity of preforming the label 1 to the shape conforming to the inner periphery of the forming die 2.

Since the resin sheet 5 is formed into a container shape as the label 1 is expanded to the shape conforming to the inner periphery of the forming die 2, there is no such possibility that radial expansion of the resin sheet 5 is unreasonably restricted and hampered by the label 1 during the process of container forming, and thus the resin sheet 5 is allowed to be accurately formed into a container shape consistent with the interior configuration of the forming die 2.

As stated above, according to the invention the tubular label is heat stretchable so that, when the resin sheet positioned within the space defined by the label is radially expanded, the label is radially expanded under heat simultaneously with the resin sheet, the label being thereby formed to a shape conforming to the inner periphery of the forming die. Therefore, even if the label is inconsistent with the configuration of the forming die, the label can be properly formed to a shape conforming to the configuration of the forming die. As a result, the necessity of performing the label to the shape conforming to the inner periphery of the forming die as was customary in the past has now been eliminated, it being thus possible to carry out label forming operation far more easily than in the past, which leads to simplified manufacturing process and reduced manufacturing cost.

According to the invention, the resin sheet is formed into a container under such condition that the label is expanded to a shape conforming to the inner surface configuration of the forming die, with the result that there is no such possibility that radial expansion of the resin sheet is unreasonably restricted by any improperly preformed label, which affords an advantage that the resin sheet can be formed into a container having an appropriate configuration corresponding to the shape of the forming die.

BRIEF DESCRIPTION OF THE DRAWINGS

FIG. 2 illustrates one form of label, FIG. 2 (a) being a sectional view, FIG. 2 (b) being a perspective view;

DETAILED DESCRIPTION OF THE PREFERRED EMBODIMENTS

Figure 1A:
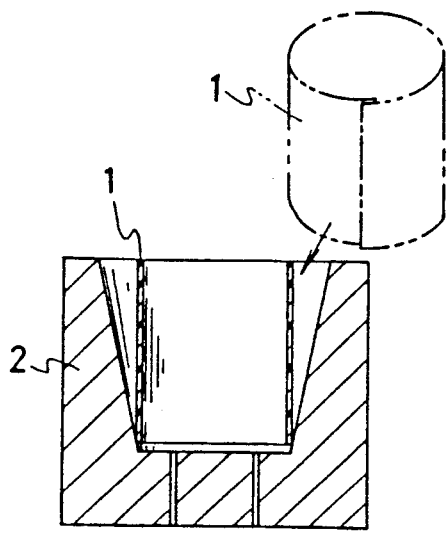
FIGS. 1 (a), (b), (c) and (d) are fragmentary sectional views showing one example of the manufacturing method according to the invention.
Figure 1B:
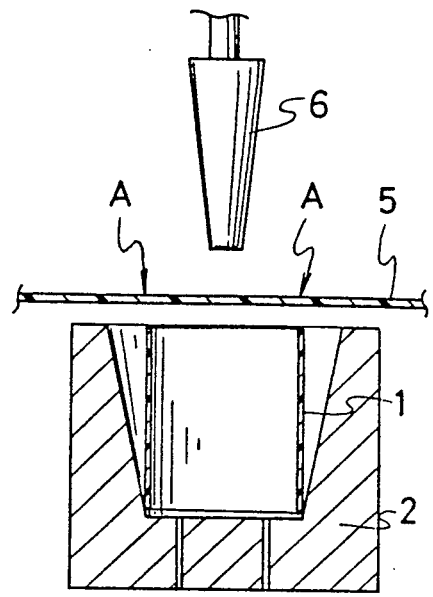
Figure 1C:
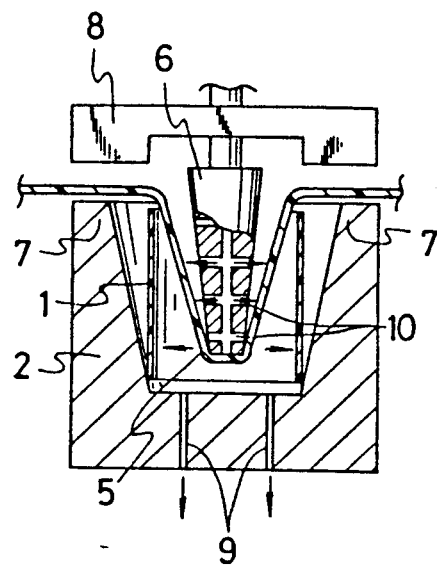
Figure 1D:
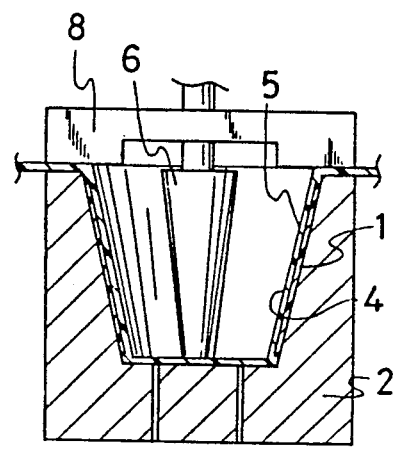
Figure 3A:
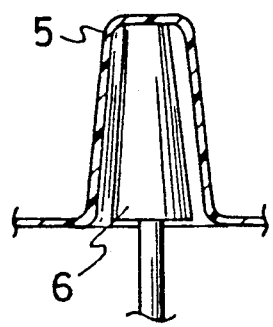
FIGS. 3 (a), (b), (c) and (d), and FIGS. 4 (a) and (b) are fragmentary sectional views showing other examples of the method of the invention.
Figure 3B:
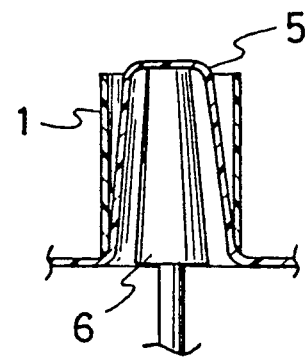
Figure 3C:
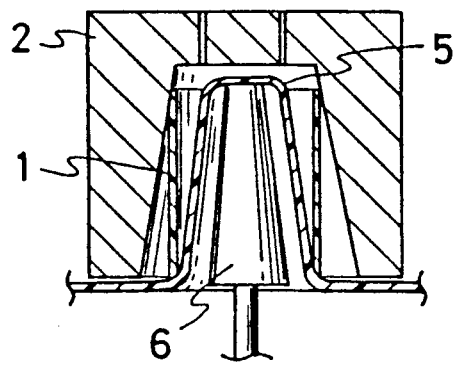
Figure 3D:
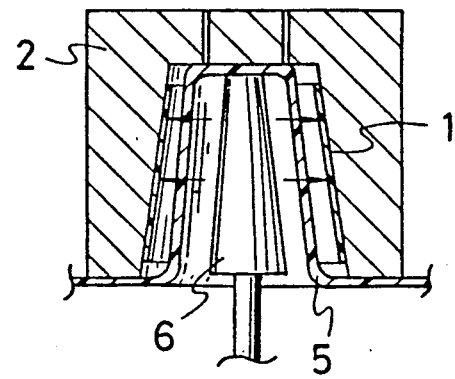

One example of the method of the invention will now be described.

A tubular label 1 is first inserted into a forming die 2 as shown in FIG. 1 (a). The label 1 comprises a heat-stretchable film 3 of, for example, unstretched polypropylene or the like material, with a suitable print given on the inner side thereof, and an adhesive layer 4 adapted for thermal adhesion with a container-forming sheet 5, as shown in FIG. 2. The label 1, as FIG. 2 (b) shows, is such that a rectangular film is formed into a tubular shape simply by bonding opposite ends 11, 11a thereof together by heat seal or otherwise; therefore, it is inconsistent with the interior configuration of the forming die 2 which is of truncated cone shape.

Container forming operation is then carried out. The thermoplastic resin sheet 5 which has been heated and softened is first placed at a level of the top opening of the forming die 2, as shown in FIG. 1 (b), and is then forced by a plug 6 of a smaller diameter than the tubular label 1 into the space defined by the label 1. In case that the resin sheet 5 may possibly come in pressure contact with the top edge of the label 1 to collapse the label 1, the resin sheet 5 above the top edge of the label 1 should be positionally fixed at points A, A by suction or otherwise by means of a holder (not shown). In that case, the plug 6 is desirably heated in order to prevent the resin sheet from becoming cooled down.

After the resin sheet 5 is forced deep into the space as shown in FIG. 1 (c), a portion of the resin sheet 5 lying over a shoulder 7 of the forming die 2 is pressed and fixed by a top frame 8, and then compressed air is released through compressed-air discharge openings provided on sides of the plug 6 so that the resin sheet 5 is radially expanded. For the compressed air, heated air may be used as required. Such expanding operation may be separately carried out by evacuating the interior of the forming die 2 through vaccum suction holes provided at the bottom of the forming die 2. It is also possible to use these two kinds of means.

During the process of the resin sheet 5 being radially stretched, the tubular label 1 is heated through its contact with the resin sheet 5 in thermally softened state. Since the label 1 is a heat-stretchable film, however, the label 1 is radially expanded in response to the expansion of the resin sheet 5. Consequently, as FIG. 1 (d) shows, the label 1 is expanded and stretched to same shape as the interior of the forming die 2, so that it is finally formed to a shape even with and suitably conforming to the outer configuration of the resin sheet 5 formed into a container. By the label 1 being so shaped to conform to the inner surface configuration of the forming die 2, the resin sheet 5 which is formed into shape internally of the label 1 is formed into a container having the required configuration as such. The label 1 is brought in strong and integral bond with the outer surface of the resin sheet 5 as the adhesive layer 4 on its inner side is heated.

In the foregoing example, the resin sheet 5 is forced into the forming die 2 after the label 1 is inserted into the forming die 2, but it is understood that the invention is not limited by such sequence of operation.

For example, as FIG. 3 (a) shows, the resin sheet 5 is first formed into crown shape by being forced upward by the plug 6 and, as FIG. 3 (b) shows, the tubular label 1 is then loosely fitted in the crowned resin sheet 5. Subsequently, as FIG. 3 (c) shows, these are inserted altogether into the forming die 2 and, as FIG. 3 (d) shows, both the resin sheet 5 and the label 1 are radially expanded by compressed air released from the plug 6.

There is no particular limitation as to the type of container forming means, such as vacuum forming or pressure forming, for use in carrying out the method of the invention. Any type of forming means may be employed inasmuch as it is useful in causing the resin sheet 5, heated and softened, to be expanded within the forming mold 2 for being formed into a container.

Figure 4A:
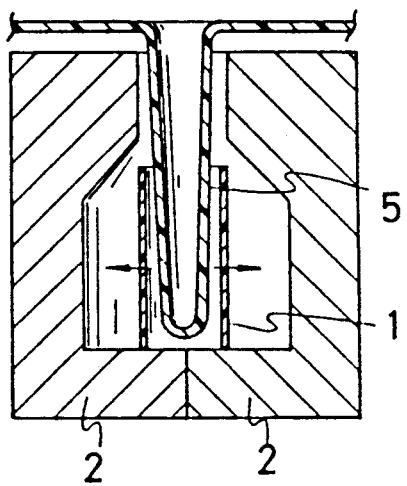
Figure 4B:
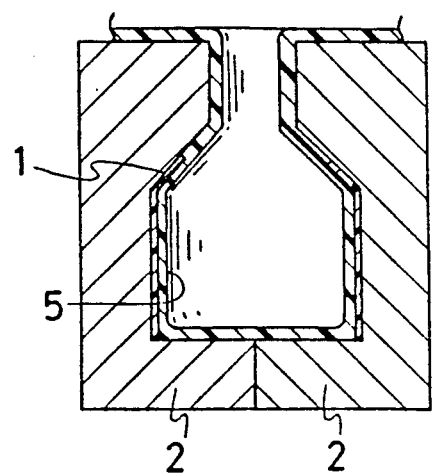
Figure 5:
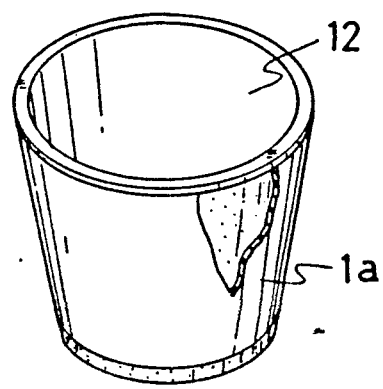
FIG. 5 is a perspective view showing one form of labeled container.
Figure 6A:
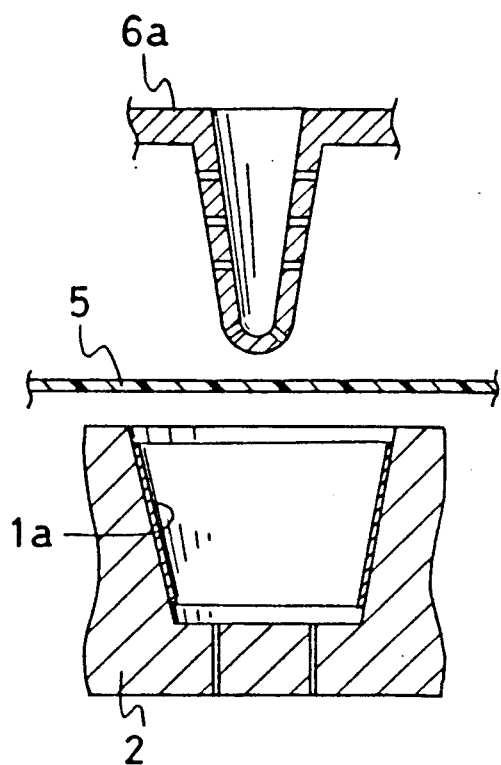
FIGS. 6 and 7 illustrate the prior art by way of example, FIGS. 6 (a), (b) being fragmentary sectional views showing the process of manufacturing operation, FIG. 7 being a perspective view showing a label.
Figure 6B:
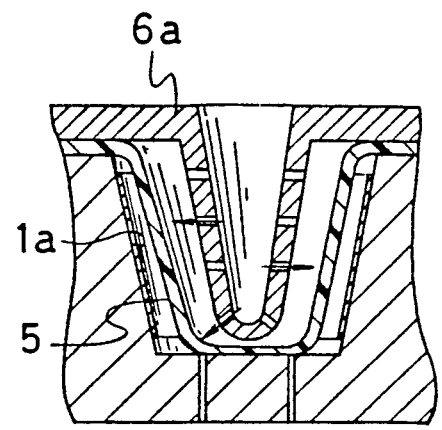
Figure 7:
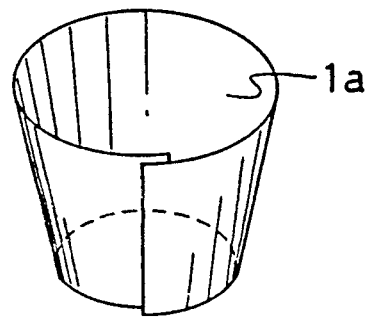

The shape and other particulars of the forming die 2 may be varied according to the configuration of the container to be formed, there being no limitation as to the arrangement of such die 2. Where a labeled container having a so-called neck-in shape, as shown in FIG. 4, is to be formed, a pair of split dies 2, 2, right and left, may be used to enable the removal of the labeled-container formed. Such changes may be freely made.

The material of the label 1 or the resin sheet 5 is in no way limited to the one used in the foregoing example. For the material of the label 1, in addition to unstretched polypropylene, the following may be mentioned, for example: unstretched polyethylene, unstretched polyester, unstretched polyvinyl chloride, and two to three time stretched resin films, such as polypropylene and polystyrene. Any resin film may be used if it is heat-stretchable. Printing may be effected by gravure, offset, screen printing or otherwise. For the printing ink, any ink incorporating a thermoplastic resin as a binder may be used. Printing may be made on whichever side of the film, outer side or inner side. A foamable ink containing microcapsules which can foam upon heating may be used to give heat insulating properties to the container.

For the adhesive layer 4, an adhesive material having thermal adhesion properties relative to the container forming resin sheet is used. Such layer may be formed by coating the label with a heat-sensitive adhesive of, for example, ethylene-vinyl acetate or chlorinated polypropylene, or of polyethlene resin or ionomer, by using extrusion coating, roll coating, gravure coating or the like coating technique.

For the resin sheet 5 to be formed into a container, various types of thermoplastic resins, such as polyvinyl chloride, polystyrene, polyethylene, polypropylene, expanded polystyrene, expanded polypropylene, and polyester, may be used in single-layer or multiple layer sheet form. It is also possible to use saponified ethylene-vinyl acetate copolymers or the like to provide a gas barrier layer.

Steps of operation involved in the manufacturing method of the invention may be varied or changed as required, and there is no particular limitation as to the means for forming a planar label 1 into tubular shape.

I claim:

1. A method of manufacturing a labeled container comprising the steps of:
   forming a label into a tube form;
   then inserting said tube form label into a forming die;
   positioning a thermoplastic synthetic resin sheet, heated and softened, above the top of the forming die containing the tube form label and then forcing the sheet into the hollow space defined by the tube form label;
   radially expanding the resin sheet, which has been forced into the hollow space, to form a container shape conforming to the inner surface configuration of the forming die such that both the resin sheet formed into the container shape and the label are formed into an integral body;

said method further characterized in that said label is heat stretched such that said label is radially expanded under heat simultaneously with the resin sheet as said resin sheet is radially expanded within the tube form label, whereby both said label and said resin sheet are formed into a shape conforming to the inner surface configuration of the forming die.

2. A method of manufacturing a labeled container comprising the steps of:

forcing a thermoplastic synthetic resin sheet, heated and softened, upward to form a crown shaped sheet portion;

forming a label into a tube form and then loosely fitting the tube form label around the crown shaped sheet portion;

inserting the crown shaped sheet portion fitted with said tube form label into a forming die;

radially expanding the crown shaped sheet portion to form a container shape conforming to the inner surface configuration of the forming die such that both the crown shaped sheet portion formed into the container shape and the label are formed into an integral body;

said method further characterized in that said label is heat stretchable such that said label is radially expanded under heat simultaneously with the crown shaped sheet portion as said crown shaped sheet portion is radially expanded within the tube form label, whereby both said label and said crown shaped sheet portion are formed into a shape conforming to the inner surface configuration of the forming die.

* * * * *